(12) United States Patent
Yeh et al.

(10) Patent No.: US 7,067,058 B2
(45) Date of Patent: Jun. 27, 2006

(54) HYDROPHILIC MEMBRANE AND PROCESS FOR MAKING THE SAME

(75) Inventors: Eshan B. Yeh, Unionville, CT (US); Michael S. Mezhirov, Bridgeport, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/404,968

(22) Filed: Apr. 1, 2003

(65) Prior Publication Data
US 2004/0195172 A1    Oct. 7, 2004

(51) Int. Cl.
*B01D 39/00*    (2006.01)
(52) U.S. Cl. .................. 210/500.35; 210/500.41; 210/500.38; 210/500.27; 210/500.21; 264/41
(58) Field of Classification Search .......... 210/500.35, 210/500.41, 500.38, 500.27
See application file for complete search history.

(56) References Cited

U.S. PATENT DOCUMENTS

| 4,302,334 A | 11/1981 | Jakabhazy et al. |
| 4,618,533 A | 10/1986 | Steuck |
| 4,774,132 A | 9/1988 | Joffee et al. |
| 4,776,959 A | 10/1988 | Kasai et al. |
| 4,794,002 A | 12/1988 | Henis et al. |
| 4,810,384 A | 3/1989 | Fabre |
| 4,855,163 A | 8/1989 | Joffee et al. |
| 4,917,793 A | 4/1990 | Pitt et al. |
| 4,921,654 A | 5/1990 | Hou et al. |
| 4,943,373 A | 7/1990 | Onishi et al. |
| 4,944,879 A | 7/1990 | Steuck |
| 4,964,989 A | 10/1990 | Gsell |
| 4,976,897 A * | 12/1990 | Callahan et al. ............ 264/425 |
| 5,019,260 A | 5/1991 | Gsell et al. |
| 5,019,261 A | 5/1991 | Stengaard |
| 5,032,331 A | 7/1991 | Onishi et al. |
| 5,066,401 A | 11/1991 | Müller et al. |
| 5,104,729 A | 4/1992 | Stedronsky |
| 5,120,440 A | 6/1992 | Nemoto et al. |
| 5,122,273 A | 6/1992 | Rekers et al. |
| 5,158,721 A | 10/1992 | Allegrezza, Jr. et al. |
| 5,279,856 A | 1/1994 | Koyama et al. |
| 5,476,590 A | 12/1995 | Brose et al. |
| 5,503,746 A | 4/1996 | Gagnon |
| 5,531,900 A | 7/1996 | Raghavan et al. |
| 5,547,575 A | 8/1996 | Demmer et al. |

(Continued)

FOREIGN PATENT DOCUMENTS

EP    0 566 754 A1    10/1993

(Continued)

OTHER PUBLICATIONS

J. Polym. Sci. A: Polym Chem 35:1227-1235, 1997.

(Continued)

*Primary Examiner*—W. L. Walker
*Assistant Examiner*—Krishnan S. Menon
(74) *Attorney, Agent, or Firm*—R. Thomas Payne

(57) ABSTRACT

A process for imparting hydrophilic properties to a polymeric membrane by exposing the membrane to an acrylate monomer containing hydrophilic segments, such as ethylene oxide, and a hydrophilic functional group, a diacrylate monomer containing hydrophilic functional groups, and an initiator for facilitating crosslinking and polymerization reactions.

31 Claims, 2 Drawing Sheets

U.S. PATENT DOCUMENTS

| | | |
|---|---|---|
| 5,629,084 A | 5/1997 | Moya |
| 5,736,051 A | 4/1998 | Degen et al. |
| 5,788,862 A | 8/1998 | Degen et al. |
| 5,885,456 A | 3/1999 | Charkoudian et al. |
| 5,911,880 A | 6/1999 | Klein et al. |
| 6,039,872 A | 3/2000 | Wu et al. |

FOREIGN PATENT DOCUMENTS

| | | |
|---|---|---|
| WO | WO 90/09230 | 8/1990 |
| WO | WO 96/06671 | 3/1996 |
| WO | WO 98/08595 | 3/1998 |

OTHER PUBLICATIONS

Macromolecules, 32: 1643-1650, (1999).

Marchand-Brynaert, et al., Surface Hydroxylation of Poly(vinylidene fluoride) (PVDF) Film, J. Polym. Sci. A: Polym Chem 35:1227-1235, 1997.

Hester, et al., Preparation of Protein-Resistant Surfaces on Poly(vinylidene fluoride) Membranes via Surface Segregation, Macromolecules, 32: No. 5, 1643-1650, (1999).

Copy of International Search Report dated Aug. 24, 2004.

* cited by examiner

HYDROPHILIC MEMBRANE AND PROCESS FOR MAKING THE SAME

BACKGROUND OF THE INVENTION

1. Field of the Invention

The subject disclosure relates to a process for manufacturing membranes and membrane products, and more particularly, to a process for using polymer crosslinking to impart desirable characteristics to polymeric membranes and the membrane products therefrom.

2. Background of the Related Art

Microfiltration polymeric membranes are currently widely used in many industries for processes and applications such as filtrations, separation and concentration of solutions and suspensions. These membranes are fabricated by a phase inversion process.

By the term "phase inversion process," we mean a process of exposing a polymer solution to a controlled environment to induce liquid-liquid demixing so as to form a pore structure. Phase inversion is a necessary step in the formation of microporous membrane. The process is induced by a number of mechanisms well known to those versed in the art. Examples of phase inversion include, but are not limited to: contacting the polymer solution coating to a solution of solvent and nonsolvent containing a higher percentage of nonsolvent than the polymer solution solution; thermally induced phase inversion; and exposing membrane to a vapor interface and evaporating the solvent from the polymer solution coating.

The effectiveness of these membranes is significantly limited by fouling at the membrane surface and pores, which, among other things, increases the pressure drop, decreases the permeate flux and changes solute selectivity over time. In certain applications, such as those which involve oil or protein containing solutions, membrane cleaning and replacement costs associated with fouling can increase the process operating costs to the point at which it becomes a significant economic burden to using membrane technology.

A major cause of fouling in these applications is due to the attraction of organics in the solution to the hydrophobic materials (i.e., "protein binding") from which these membranes are typically fabricated. Protein binding often poses a more serious dilemma which causes even greater economic harm than the issues associated with membrane fouling due to loss of important proteins to the customer, especially when the binding occurs at lower concentrations.

The hydrophobic materials used in membrane manufacture typically possess low surface tension values and lack active groups in their surface chemistry for formation of "hydrogen-bonds" with water. Membranes fabricated from such materials have low wettability, that is, a high surface tension liquid, such as water, is not adsorbed into the membrane and instead tends to form discrete droplets on the membrane surface, without sufficient pressure in the system.

In contrast, membranes constructed of hydrophilic materials typically possess a high surface tension value and have the ability to form "hydrogen-bonds" with water, which results in the formation of a water film on the membrane surface. In addition, fouling of membranes prepared from hydrophilic materials is less severe and often reversible but these membranes have comparatively poor mechanical and thermal stability, and may be susceptible to chemical reactions with the process solution.

Membranes constructed of nylon are an exception to the above, in that nylon membranes are hydrophilic but they have a high tendency to bind proteins, which is probably due to the presence of amide and amine groups in the nylon chemical structure.

Hydrophobic membranes are typically used as sterile air filters where hydrophilic membranes could not function, whereas hydrophilic membranes are overwhelmingly preferred for aqueous applications. There is still a desire to impart a hydrophilic surface to naturally hydrophobic membranes to exploit other desirable properties such as excellent chemical resistance, along with desirable thermal and mechanical properties, which still makes using them more cost-effective than membranes constructed of hydrophilic materials regardless of the aforementioned benefits.

Since the properties of hydrophilic materials are more desirable than the properties of hydrophobic materials (at least for use in aqueous applications), it is the current practice in the art to modify polymeric membranes constructed of materials which are normally hydrophobic, such as polyvinylidene fluoride ("PVDF") and polyethersulfone ("PES"), so that they possess both hydrophilic and low protein binding properties in addition to the beneficial characteristics of the material as described above. In summary, the most commonly employed methods for modifying polymeric membranes may be described as follows: (i) polymeric coating with crosslinking, (ii) surface activation followed by grafting and (iii) blending with co-polymers.

An important advantage to modifying a membrane using the method involving polymer coating with crosslinking is its simplicity, both conceptually and in practice. However, a disadvantage to currently used techniques is that the applied coating may not be thermally or mechanically stable. Surface modifications, such as hydrophilicity, which are imparted to hydrophobic membranes by this method are prone to deterioration over time. This is especially true when these membranes are exposed to high temperature conditions.

U.S. Pat. No. 4,618,533 (the '533 patent) describes a typical coating method where a PVDF membrane is post-treated with a solution containing a monomer, crosslinker and initiator prior to ultraviolet radiation (UV) or thermal treatment. The '533 patent teaches using the monomers hydroxyalkyl acrylate or methacrylate, of which, hydroxypropyl acrylate (HPA) is an example. A major problem with PVDF membranes fabricated according to the process disclosed in the '533 patent is that they tend to lose part or all of their hydrophilicity after being heating at more than 130° C.

Methods involving surface activation followed by grafting requires exposure to UV or electron beam (EB) radiation, high energy chemicals or other high energy source, such as ozone or plasma, to generate free radicals or other highly activated species on the substrate surface for grafting. For example, in U.S. Pat. Nos. 5,019,260 and 5,736,051, high energy electron beams or gamma rays are used to activated the surface before the membrane contacts the monomer solution, and without such high energy irradiation, no reaction will occur.

Although the grafting method usually preserves most of the substrate properties and generally provides the best overall results out of the three methods for modifying a membrane listed above, it is not widely used because of the expense and safety issues associated with using high energy sources or high energy chemicals. Because of these problems, this technique is typically reserved for rare instances in which the substrate material can be activated rather easily.

Blending with copolymers is a less rigorous and more economical method for modifying membrane properties. However, this technique is also less effective than the aforementioned methods because the co-polymers added to modify the membrane characteristics are dispersed throughout the resulting membrane rather than being congregated along surface, which would yield the greatest advantages of the modification. Thus, much of the benefits from the blending are lost. Another disadvantage to this method involves the co-polymer itself which must be synthesized, isolated and purified prior to being blended. Another problem with blending is that it may compromise the structure of the original polymer membrane, limiting the useful concentration range, and therefore making it difficult to modify the formulation in response to process changes.

For example, disclosed in WO98/08595, and later published in *Macromolecules* 32: 1643–1650 (1999) is the blending of comb co-polymers with PVDF to make casting dope. As described above, membranes produced from the such a method normally possess lower degrees of wettability and porosity as compared to membranes produced by the other aforementioned methods. Furthermore, the polymerization reaction and purification must be conducted before the polymer can be blended with PVDF.

Further examples of copolymer blending are found in U.S. Pat. Nos. 5,066,401 and 4,302,334, which generally disclose processes for forming hydrophilic membranes by hydrolyzing a blend of PVDF and a second polymer, such as polyvinyl acetate. Membranes from such processes exhibit better wettability in acid solution, primarily due to further hydrolysis being catalyzed under the acidic conditions. However, in neutral condition, the wettability is inferior. A similar kind of blending process was described in U.S. Pat. Nos. 5,122,273 and 5,503,746, in which polyalkylene glycol or polyvinyltrifluoroacetate were used. Although membranes from such process exhibit reduced protein binding, the reduction is not enough to make them suitable for protein solution filtration, among other things.

In summary, the presently available methods for modifying membranes to impart desirable characteristics thereto have many disadvantages. The problems associated with these methods notwithstanding, there remains a strong demand for improved membranes for a variety of existing applications. Furthermore, there are current and possibly future situations in which membranes could be utilized advantageously but are not because of the problems associated with membranes produced by the aforementioned methods. The purpose of the present invention is to provide a useful process for modifying membranes and a modified membrane, which, among other things, overcomes the shortcoming of the prior art.

SUMMARY OF THE INVENTION

The subject invention overcomes the shortcoming of the prior art by providing, among other things, a simple and economical process for producing a membrane having hydrophilic and low protein binding characteristics that are thermally and mechanically stable while also being unsusceptible to chemical attack. The manufacture of membranes in accordance with the present invention may be conducted as a batch or continuous process. Another purpose of the present invention is to disclose a membrane product having a mechanically and thermally stable coating (i.e., resistant to deterioration and fracture), which also exhibits hydrophilic and low non-specific protein binding properties. It is a further object of the present invention to provide a method for imparting the aforementioned properties to membranes constructed of hydrophobic polymers.

The present invention is directed to a process for making a hydrophilic membrane, which includes the steps of providing a polymeric membrane; providing a first monomer including hydrophilic units; providing a second monomer with hydrophilic units; providing an initiator for facilitating the polymerization and crosslinking reactions of the first and second monomers; and exposing the polymeric membrane to the first and second monomers in the presence of the initiator to actuate the polymerization and crosslinking of the first and second monomers.

In the embodiments discussed herein below the first monomer is an acrylate monomer, and the second monomer is a diacrylate monomer, however, other monomers may be advantageously utilized with the present invention. Additionally, in accordance with the method of present invention, the aforementioned steps may be conducted independently or in combination.

The aforementioned method of the present invention may also include the following additional steps: exposing the polymeric membrane to a heat source, exposing the polymeric membrane to an alkali, exposing the polymeric membrane to an alcohol or exposing the polymeric membrane to a solution with solutes that contain hydroxyl groups. The exposures may be conducted at a variety of concentrations, before, during or after any of the process steps and for a predetermined period of time. Furthermore, these additional steps may be performed either independently of, or in combination with, one or more of the aforementioned process steps in accordance with the methods of the present invention.

The polymeric membrane provided may be substantially fabricated of a hydrophobic material, such as PVDF or PES. The membrane may also be substantially fabricated of a hydrophilic material, such as nylon. In addition, the lo membrane may be substantially fabricated of any other polymeric materials that are suitable for use in microporous filtration.

The hydrophilic units associated with the diacrylate monomer preferably includes a chain of repeating hydrophilic segments and/or hydrophilic functional groups. The acrylate monomer also preferably includes a chain of repeating hydrophilic segments and a hydrophilic functional group. Preferably, the acrylate monomer includes a relatively long chain of hydrophilic segments. Longer chain monomers are generally preferred because they provide greater stability, among other things.

In a preferred embodiment, the acrylate monomer includes ethylene oxide segments and a hydroxyl functional group. Preferably, the ethylene oxide segments are greater in magnitude than one, but may be 2, 5, 10 or another amount. The diacrylate monomer may also include ethylene oxide segments and/or hydroxyl functional groups. The initiator may be sodium persulfate, ammonium persulfate or another type of initiator that may be suitable for use in polymerization and crosslinking reactions.

The present invention is also directed to a solution for imparting hydrophilic characteristics to a polymeric membrane. The solution may be used in the making of a polymeric membrane in accordance with the methods of the present invention.

The solution of the present invention includes first and second monomers each having hydrophilic units, and an initiator for facilitating polymerization and crosslinking of the first and second monomers. Preferably, the first monomer is a monofunctional acrylate monomer containing substantially hydrophilic segments and a hydrophilic functional group, and the second monomer is a difunctional diacrylate monomer containing hydrophilic functional groups. The initiator may be sodium persulfate, ammonium persulfate or other like initiator for polymerization and crosslinking reactions. The solution may also include water, an alkali, alchohol, or a solutes containing hydroxyl groups.

The monofunctional acrylate monomer may include hydrophilic segments and a hydrophilic functional group. The segments preferably include ethylene oxide and the functional group is preferably a hydroxyl group. The difunctional diacrylate monomer preferably includes ethylene oxide segments and hydroxyl functional groups as well.

The present invention is also directed to a hydrophilic polymeric membrane, which may be fabricated in accordance with the methods of the present invention and/or using a solution formulated in accordance with the present invention. The polymeric membrane of the present invention includes a microporous substrate and a crosslinked coating containing a monofunctional acrylate monomer having ethylene oxide segments and a hydrophilic functional group and a difunctional diacrylate monomer having hydrophilic functional groups.

The microporous substrate may be substantially fabricated of PVDF, PES or Nylon. The hydrophilic functional groups included with either of the monomers may be hydroxyl groups. The diacrylate monomer may also include hydrophilic segments, such as ethylene oxide.

These and other unique features of the membranes manufactured in accordance with the present invention will become more readily apparent from the following detailed description of the exemplary and presently preferred embodiments.

DETAILED DESCRIPTION OF THE PREFERRED EMBODIMENTS

Figure 1:
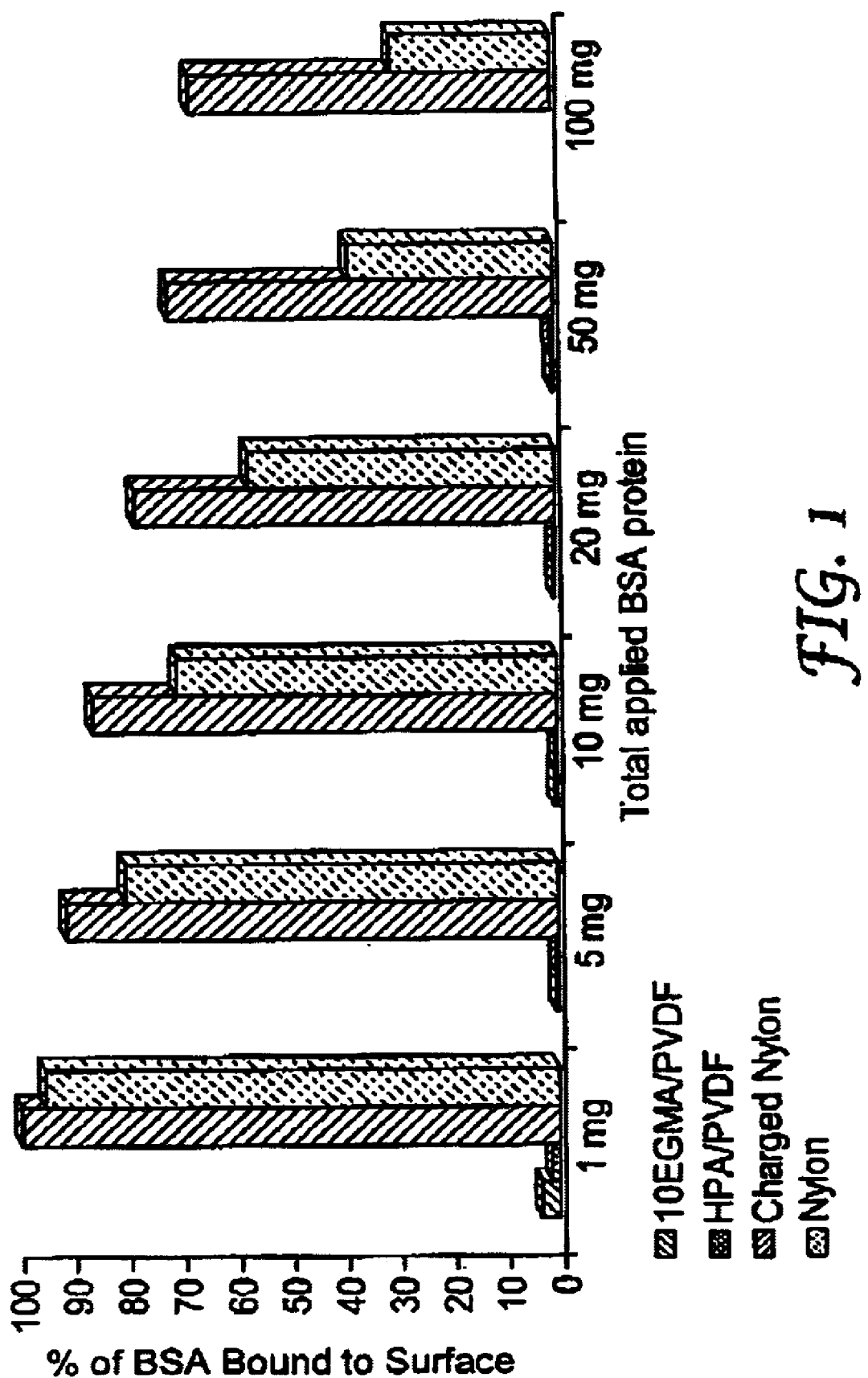
FIG. 1 illustrates the results of the protein binding tests flow through liquid samples conducted in accordance with the present application.

The following detailed description describes and illustrates one or more specific embodiments of the invention. These specific embodiments, offered not to limit but only to exemplify and teach the invention, are shown and described in sufficient detail to enable those skilled in the art to practice the present invention. Thus, where appropriate to avoid obscuring the present invention, the description may omit certain information known to those of skill in the art.

The present invention is generally intended to provide a method for imparting desirable characteristics to a polymeric membrane which essentially does not inherently possess such characteristics, a solution that may be used to advantageously impart desirable characteristics to a polymeric membrane and a polymeric membrane product of the method of the present invention for use in microporous filtration.

Preliminarily, it should be understood that microporous membranes are well known in the art. Microporous membranes are porous solids which contain microporous interconnecting passages that extend from one surface to the other. These passages provide tortuous tunnels through which the liquid which is being filtered must pass. The particles contained in the liquid passing through a microporous membrane become trapped on or in the membrane structure effecting filtration. A pressure, generally in the range of about 5 to about 50 psig (pounds per square inch gauge) is used to force fluid through the microporous membrane. The particles in the liquid that are larger than the pores are either prevented from entering the membrane or are trapped within the membrane pores. The liquid and particles smaller than the pores of the membrane pass through. Thus, a microporous membrane prevents particles of a certain size or larger from passing through it, while at the same time permitting liquid and particles smaller than that certain size to pass through. Typical microporous membranes have the ability to retain particles in the size range of from about 0.01 to about 10.0 microns.

In accordance with the method of the present invention, characteristics imparted to the membrane of choice include hydrophilicity, which typically results in spontaneous wetting and improved flow on the membrane, among other things. In practice, a microporous membrane is provided having desirable mechanical and chemical properties. The method of the present invention imparts properties to the membrane that reduce adhesion of gas bubbles, reduce protein adsorption and denaturation, reduce microbial adherence, improve surface printability and improves liquid or blood handling characteristics, among other things.

The present invention is especially advantageous for use with membranes that are fabricated of a hydrophobic, substantially chemically inert, polymeric material of high mechanical strength, but the method of the present invention may be used with membranes fabricated of materials having different properties as well. Preferably, the membranes are fabricated of polymeric materials, and more preferably, the membranes are fabricated substantially of PVDF. Other porous hydrophobic or non-hydrophobic membranes formed of an interpenetrating network may be utilized, so long as the cross-linking reaction to impart hydrophilic properties in accordance with the present invention remains possible.

According to the present invention, a monomer is used to modify the surface of the membrane to provide hydrophilicity, low protein binding and thermal and mechanical stability. Generally, such hydrophilicity is enhanced in the presence of a sufficient amount of hydroxyl (OH—), alkyl oxide (—R—O—), carboxyl (—COOH), amino (—NH$_2$) and/or similar functional groups on the surface of the membrane. These groups are known to assist in the adsorption and/or absorption of water onto the membrane. However, carboxyl and amino groups are less preferred, due to their ability to bind proteins.

Preferably, a surface-modifying monomer with both a hydroxyl functional group and a long flexible chain with ethylene oxide segments is used to fulfill both low protein binding and thermal and mechanical stability. Hydroxyl groups are presently preferred for use in the coating material, even though the aforementioned groups, as well as ethylene oxide groups (—O—C—C—), are also hydrophilic, primarily because hydroxyl groups have been found to be more resistant to protein binding. Also, use of hydroxyl groups with a long flexible chain of ethylene oxide segments in accordance with the method of the present invention advantageously imparts other useful properties to the subject membrane.

For example, crosslinking involving hydroxyl groups with ethylene oxide units results in greater chain flexibility due to the wide swing angles. In addition, the glass transition temperature ($T_g$) is reduced, which increases the temperature range in which the membrane will remain in the rubbery state, thus providing a membrane of desirable pliancy over a range of temperature. For these reasons, a monomer of the following structure is sought after, which will be called nEGMA (n-ethylene glycol ethyl methacrylate), where n is a variable corresponding to the subscript n in the following formula:

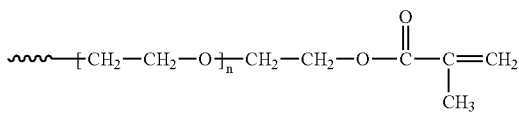

With the addition of the hydroxyl functional group, the formulation becomes:

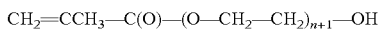

It should be noted that a related but different compound with a hydrophilic unit, hydroxypropyl acrylate (HPA) having the formula

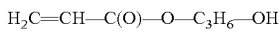

has been disclosed in the prior art as offering both a hydrophilic and low protein binding characteristics in polymer membrane applications. Surprisingly, it has been found that nEGMA type monomers offer much better thermal stability over the traditionally used HPA, in addition to hydrophilicity from hydrophilic units, so that the treated membrane can be further processed at higher temperatures without losing its hydrophilicity and low protein binding characteristics in application.

The nEGMA monomers may be polymerized with or without crosslinkers of diacrylic species, such as TEGDA (tetraethylene glycol diacrylate), by thermal, UV, or other suitable initiation/activation polymerization methods known in the art. It should be readily apparent to one skilled in the art that other species of crosslinking agents may be utilized in accordance with the present invention. Preferably, the crosslinker is a difunctional monomer with hydrophilic units. For example, another useful diacrylate monomer is polyethylene glycol diacrylate, which offers the same flexible $—CH_2—CH_2—O—$ linkages, such as PEG(200) dimethacrylate, PEG(400) dimethacrylate and PEG(600) dimethacrylate (also known as PEG200DMA, PEG400DMA and PEG600DMA, respectively). PEG200DMA, PEG400DMA and PEG600DMA are also not considered to be carcinogenic.

The thermal stability of the membrane coatings constructed in accordance with the present invention were tested and compared with a membrane treated similarly with HPA. Sodium chloride solutions of about 15% and about 20% were used to increase the surface tension of water, thus making the wettability test more discriminating.

The protein binding tendencies were measured by obtaining a liquid sample of flow-through protein solution recovery and testing a solid sample of protein-on-membrane. A luminance spectrophotometer LS50B (Perkin-Elmer) was used to measure the fluorescence intensity of fluorescein-tagged bovine serum albumin (BSA). The $I^{125}$-BSA was also used as a model protein to be bound on membrane surfaces.

The following examples provide detail further aspects and embodiments of the present invention.

EXAMPLE 1

PVDF Membrane with Hydrophilic Coating Using HPA

The membrane in the hydrophobic form is first wetted with alcohol and then thoroughly washed with water. The monomer solution includes 2% HPA, 0.63% TEGDA, and 2% sodium persulfate in water. The water wetted membrane is soaked in the monomer solution for about 5 minutes and then placed between two polyester films with air pressed out with a soft roller. It is then heated at 95° C. for about 3 minutes.

EXAMPLE 2

PVDF Membrane with Hydrophilic Coating Using 10EGMA

The process of Example 1 is substantially repeated but with the HPA being replaced by 10EGMA (i.e., nEGMA, wherein n=10 in the formula shown above) in accordance with the present invention.

Wettability Test after Thermal Treatments

Membranes from Example 1 and 2 are boiled in IPA for 48 hrs, dry-heated at 135° C. for 1.5 hrs, autoclaved at 131° C. for 4 hrs, and dry-heated at 150° C. for 15 minutes. The wetting times in water, and 15% and 20% NaCl solution are recorded below:

Membranes Constructed in Accordance with the Present Invention (10EGMA/PVDF) vs. Traditional Wetting Polymer (HPA/PVDF)

| Membrane and treatment | In water | In 15% NaCl | In 20% NaCl |
|---|---|---|---|
| Membranes after coating | | | |
| 10EGMA/PVDF | Instant | Instant | Instant |
| HPA/PVDF | Instant | Instant | 3 sec. |
| After boiling in IPA for 48 hours | | | |
| 10EGMA/PVDF | Instant | instant | 10 to 15 sec. |
| HPA/PVDF | Instant | 15–20 sec | Hydrophobic |
| After heating at 135° C. for 1.5 hours | | | |
| 10EGMA/PVDF | 1 sec. | 20 sec. | 30–40 sec. |
| HPA/PVDF | 30–50 sec. | Hydrophobic | Hydrophobic |
| After wet and dry autoclaves at 131° C. for 4 hours | | | |
| 10EGMA/PVDF | Instant | 1 sec. | 5–9 sec. |
| HPA/PVDF | Instant | 1.5 min. | 25 min. |
| After heating at 150° C. for 15 minutes | | | |
| 10EGMA/PVDF | Instant | Hydrophobic | Hydrophobic |
| HPA/PVDF | Hydrophobic | Hydrophobic | Hydrophobic |

Protein Binding Tests: Flow Through Liquid Samples

The protein binding tendencies were measured by obtaining a liquid sample of flow-through protein solution recovery and testing a solid sample of protein-on-membrane. A luminance spectrophotometer LS50B (Perkin-Elmer) was used to measure the fluorescence intensity of fluorescein-tagged bovine serum albumin (BSA). The $I^{125}$- BSA was also used as a model protein to be bound on membrane surfaces. The results are illustrated in FIG. 1.

Protein Binding Tests: Flow Through Solid Samples

Figure 2:
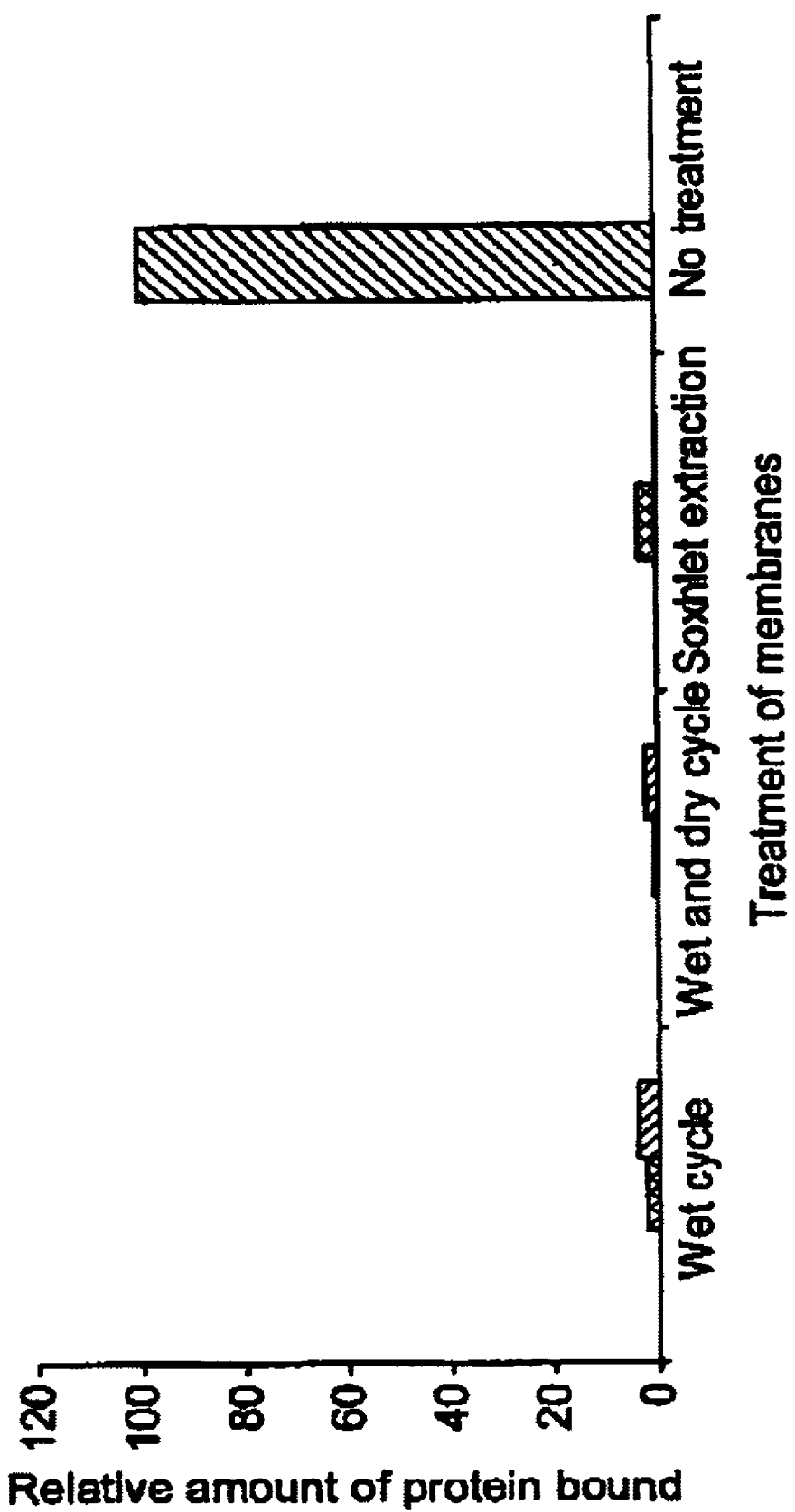
FIG. 2 illustrates the results of the protein binding tests flow through solid samples conducted in accordance with the present application.

The low protein binding properties of the present invention can also be demonstrated directly by measuring BSA on solid membrane samples. A high protein binding Nylon membrane 045S1 was also tested for comparative purposes as a control. The results are shown in FIG. 2.

While the invention has been described with respect to preferred embodiments, those skilled in the art will readily appreciate that various changes and/or modifications can be made to the invention with departing from the spirit or scope of the invention.

What is claimed is:

1. A process for making a hydrophilic membrane, comprising the acts of:
    providing a polymeric micronorous membrane;
    providing an monofunctional acrylate monomer nEGMA, wherein nEGMA comprises $OH_2=CCH_3-C(O)-(O-CH_2-CH_2)_{n+1}-OH$ and where n is a variable of greater magnitude than one;
    providing a diacrylate monomer including hydrophilic units;
    providing an initiator for facilitating polymerization and crosslinking reactions of the acrylate and diacrylate monomers; and
    exposing the polymeric membrane to the acrylate and diacrylate monomers in the presence of the initiator to actuate polymerization and crosslinking of the acrylate and diacrylate monomers.

2. The process of claim 1, further comprising the act of exposing the polymeric membrane to a heat source.

3. The process of claim 1, wherein the act of providing a polymeric membrane further comprises:
    providing a membrane substantially fabricated of a hydrophobic material.

4. The process of claim 1, wherein the act of providing a polymeric membrane further comprises:
    providing a membrane substantially fabricated of PVDF.

5. The process of claim 1, wherein the act of providing a polymeric membrane further comprises:
    providing a membrane substantially fabricated of nylon.

6. The process of claim 1, wherein the act of providing a polymeric membrane further comprises:
    providing a membrane substantially fabricated of PES.

7. The process of claim 1, further comprising the act of:
    exposing the polymeric membrane to an alkali.

8. The process of claim 1, further comprising the act of:
    exposing the polymeric membrane to solutes containing hydroxyl groups.

9. The process of claim 1, wherein the act of providing a diacrylate monomer including hydrophilic units further comprises providing TEGDA.

10. The process of claim 1, wherein the act of providing a diacrylate monomer including hydrophilic units further comprises:
    providing PEG(200) dimethacrylate.

11. The process of claim 1, wherein the act of providing a diacrylate monomer including hydrophilic units further comprises:
    providing PEG(400) dimethacrylate.

12. The process of claim 1, wherein the act of providing a diacrylate monomer including hydrophilic units further comprises providing PEG(600) dimethacrylate.

13. The process of claim 1, wherein the act of providing an acrylate monomer including hydrophilic units further comprises providing
    an acrylate monomer having a chain of repeating hydrophilic segments.

14. The process of claim 13, wherein the act of providing an acrylate monomer including a chain of repeating hydrophilic segments further comprises:
    providing an acrylate monomer including a chain of ethylene oxide segments.

15. The process of claim 1, wherein the act of providing an acrylate monomer including hydrophilic units further comprises:
    providing an acrylate monomer including a chain of ethylene oxide segments and a hydrophilic functional group.

16. The process of claim 15, wherein the act of providing an acrylate monomer including a chain of ethylene oxide segments and a hydrophilic functional group further comprises:
    providing an acrylate monomer including a chain of ethylene oxide segments and a hydroxyl functional group.

17. The process of claim 1, wherein the act of providing an initiator for facilitating polymerization and crosslinking reactions of the acrylate and diacrylate monomers further comprises providing sodium persulfate.

18. The process of claim 1, wherein the act of providing an initiator for facilitating polymerization and crosslinking reactions of the acrylate and diacrylate monomers further comprises providing ammonium persulfate.

19. A substantially thermally stable hydrophilic polymeric membrane comprising:
    a phase inverted microporous substrate;
    a crosslinked surface coating including the monofunctional acrylate monomer nEGMA, wherein nEGMA comprises $OH_2=CCH_3-C(O)-(O-CH_2-CH_2)_{n+1}-OH$ and where n is a variable of greater magnitude than one; and
    a difunctional diacrylate monomer having hydrophilic functional groups.

20. The hydrophilic polymeric membrane of claim 19 further comprising:
    a hydroxyl group included with the monofunctional acrylate monomer.

21. The hydrophilic polymeric membrane of claim 19, wherein the microporous substrate is substantially fabricated of PVDF.

22. The hydrophilic polymeric membrane of claim 19, wherein the microporous substrate is substantially fabricated of PES.

23. The hydrophilic polymeric membrane of claim 19, wherein the microporous substrate is substantially fabricated of nylon.

24. The hydrophilic polymeric membrane of claim 19, wherein n is equal to 10.

25. The hydrophilic polymeric membrane of claim 19, wherein the difunctional diacrylate monomer is TEGDA.

26. The hydrophilic polymeric membrane of claim 19, wherein the difunctional diacrylate monomer is PEG(200) dimethacrylate.

27. The hydrophilic polymeric membrane of claim 19, wherein the difunctional diacrylate monomer is PEG(400) dimethacrylate.

28. The hydrophilic polymeric membrane of claim 19, wherein the difunctional diacrylate monomer is PEG(600) dimethacrylate.

29. The membrane of claim 19 wherein the membrane retains its hydrophilicity (is DI water wettable) after heating for about 4 hours at about 130° C.

30. The membrane of claim 19 wherein the membrane retains its hydrophilicity (is DI water wettable) after heating for about 1.5 hours at about after 135° C.

31. The membrane of claim 19 wherein the membrane retains its hydrophilicity (is DI water wettable) after heating for about 15 minutes at about after 150° C.

* * * * *

UNITED STATES PATENT AND TRADEMARK OFFICE
CERTIFICATE OF CORRECTION

PATENT NO.         : 7,067,058 B2                                       Page 1 of 1
APPLICATION NO.    : 10/404968
DATED              : June 27, 2006
INVENTOR(S)        : Eshan B. Yeh It is certified that error appears in the above-identified patent and that said Letters Patent is hereby corrected as shown below:

Column 9,
Line 21, delete "micronorous" and insert --microporous--.
Line 24, delete "$OH_2$" and insert --$CH_2$--.

Column 10,
Line 42, delete "$OH_2$" and insert --$CH_2$--.

Signed and Sealed this

Seventeenth Day of October, 2006

JON W. DUDAS
*Director of the United States Patent and Trademark Office*